(12) United States Patent
Nepveu et al.

(10) Patent No.: US 11,736,822 B1
(45) Date of Patent: Aug. 22, 2023

(54) CONTROLLING AN IMAGE SENSOR BASED ON GPU TEMPORAL PROCESSING VALUES

(71) Applicant: Apple Inc., Cupertino, CA (US)

(72) Inventors: Bertrand Nepveu, Los Altos, CA (US); Marc-Andre Chenier, Saint-Hyacinthe (CA); Yan Cote, Notre-Dame-de-l'ile-Perrot (CA); Yves Millette, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 168 days.

(21) Appl. No.: 17/176,771

(22) Filed: Feb. 16, 2021

Related U.S. Application Data (60) Provisional application No. 62/983,144, filed on Feb. 28, 2020.

(51) Int. Cl.
  *G06T 1/60* (2006.01)
  *G06T 1/20* (2006.01)
  *H04N 23/80* (2023.01)
  *H04N 5/351* (2011.01)

(52) U.S. Cl.
  CPC ............ *H04N 5/351* (2013.01); *G06T 1/20* (2013.01); *G06T 1/60* (2013.01); *H04N 23/80* (2023.01)

(58) Field of Classification Search
  CPC ............ H04N 5/23203; H04N 5/23229; H04N 5/335; H04N 5/351; G06T 1/0007; G06T 1/20; G06T 1/60
  See application file for complete search history.

(56) References Cited

U.S. PATENT DOCUMENTS

| | | | |
|---|---|---|---|
| 2016/0225339 A1* | 8/2016 | Kim | .................... G09G 3/20 |
| 2017/0199563 A1* | 7/2017 | Wang | .................... G06F 1/324 |
| 2018/0089808 A1* | 3/2018 | Ling | .................... G06T 1/00 |
| 2018/0210530 A1 | 7/2018 | Kwon et al. | |
| 2019/0230375 A1 | 7/2019 | Kopietz | |
| 2019/0317741 A1 | 10/2019 | Herr et al. | |

* cited by examiner

*Primary Examiner* — Daniel M Pasiewicz
(74) *Attorney, Agent, or Firm* — Fernando & Partners, LLP (57) ABSTRACT

A method includes obtaining a first plurality of image frames that are provided by an image sensor at a first output rate. The method includes determining a GPU temporal processing value characterizing the GPU processing of the first plurality of image frames. The GPU temporal processing value is a function of an amount of information associated with the first plurality of image frames. The method includes determining an operation value associated with the image sensor based on a function of the GPU temporal processing value. The operation value modifies the operation of the image sensor. The method includes changing, using a controller, the operation of the image sensor as a function of the operation value so that the image sensor provides a second plurality of image frames at a second output rate.

21 Claims, 5 Drawing Sheets

CONTROLLING AN IMAGE SENSOR BASED ON GPU TEMPORAL PROCESSING VALUES

CROSS-REFERENCE TO RELATED APPLICATION

This application claims priority to U.S. Provisional Patent App. No. 62/983,144, filed on Feb. 28, 2020, which is hereby incorporated by reference in its entirety.

TECHNICAL FIELD

The present disclosure relates to assessing processing characteristics of a graphics processing unit (GPU), and, in particular, using the GPU processing characteristics to control an image sensor.

BACKGROUND

The amount of time a graphics processing unit (GPU) takes to process a sequence of frames varies based on an amount of information characterizing the sequence of frames. The amount of information characterizing a sequence of frames is also described as the complexity of the image data within the frames. Accordingly, the output rate at which the GPU outputs processed data varies based on the amount of information (or image data complexity) characterizing the sequence of frames.

In a previously available graphics pipeline, an image sensor outputs image data in the form of frames, at a constant output frame rate that is independent of image data complexity, to the GPU for processing. When the GPU output rate exceeds or falls below a specified range, however, the graphics pipeline, as a whole, experiences inefficiencies, such as data overrun or underrun relative to the specified range. The graphics pipeline inefficiencies degrade a user experience due to undesirable displayed attributes at the display device, such as resulting from lag, latency, distortion, presence of artifacts, etc.

SUMMARY

In accordance with some implementations, a method is performed at an electronic device with a controller, a non-transitory memory, and a graphics processing unit (GPU). The method includes obtaining a first plurality of image frames that are provided by an image sensor at a first output rate. The method includes determining a GPU temporal processing value characterizing the GPU processing of the first plurality of image frames. The GPU temporal processing value is a function of an amount of information associated with the first plurality of image frames. The method includes determining an operation value associated with the image sensor based on a function of the GPU temporal processing value. The operation value modifies the operation of the image sensor. The method includes changing, using the controller, the operation of the image sensor as a function of the operation value so that the image sensor provides a second plurality of image frames at a second output rate.

In accordance with some implementations, an electronic device includes a controller, a non-transitory memory, and a GPU. The one or more programs are stored in the non-transitory memory and configured to be executed by the controller, and the one or more programs include instructions for performing or causing performance of the operations of any of the methods described herein. In accordance with some implementations, a non-transitory computer readable storage medium has stored therein instructions which when executed by a controller of an electronic device, cause the electronic device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

SUMMARY

The amount of time a graphics processing unit (GPU) takes to process a sequence of frames varies based on an amount of information characterizing the sequence of frames. The amount of information characterizing a sequence of frames is also described as the complexity of the image data within the frames. For example, the amount of time for a GPU to process a sequence of frames is a function of the complexity of image data within individual frames and/or the amount of change in the image data associated with the sequence of frames. In other words, a GPU performs more processing cycles on higher complexity image data than on image data with lower complexity. Accordingly, the output rate at which the GPU outputs processed data varies based on the amount of information (or image data complexity) characterizing the sequence of frames.

In some graphics pipelines, an image sensor outputs image data in the form of frames, at a constant output frame rate, to the GPU for processing. The constant output frame rate is independent of the image data complexity, which may fluctuate across a sequence of frames. Fluctuating image data complexity leads to a correspondingly fluctuating GPU output rate. When the GPU output rate exceeds or falls below a specified range, however, the graphics pipeline, as a whole, experiences inefficiencies, such as data overrun or underrun relative to the specified range at which the graphics pipeline components is configured to operate. For example, the GPU output rate may fall below the specified range due to processing relatively high complexity image data. In turn, downstream graphics pipeline components may experience data underrun, because the downstream graphics pipeline components are configured to receive processed data at a faster rate from the GPU. As a counterexample, the GPU output rate may exceed the specified range due to processing relatively low complexity image data. Accordingly, downstream graphics pipeline components may experience data overrun, because the downstream graphics pipeline components are configured to receive processed data at a slower rate from the GPU. The graphics pipeline inefficiencies degrade a user experience due to undesirable displayed attributes at the display device, such as resulting from lag, latency, distortion, presence of artifacts, etc.

By contrast, various implementations disclosed herein provide methods, electronic devices, and systems that determine and use a GPU temporal processing value in order to modify an operation of an image sensor, such an image sensor output rate, image sensor delay value, image sensor output decimation value, etc. The GPU temporal processing value temporally characterizes how the GPU processes or may process and is a function of an amount of information associated with the image frames. Controlling the operation of the image sensor based on GPU processing characteristics (e.g., based on image data complexity) enables the GPU to output data to pipeline components within a specified range at which the graphics pipeline components are configured to operate. As one example, for relatively high complexity image data, the method includes reducing the image sensor output rate (e.g., fewer image frames per second to the GPU) in order to enable the GPU to output corresponding data to the pipeline components within the specified range. Accordingly, in contrast to other systems, graphics pipeline components receive GPU output data, characterized by varying levels of complexity (e.g., corresponding to varying levels of image data complexity), at rates that are within the specified range. Thus, various implementations disclosed herein enable the GPU to output data so as to reduce data overrun and underrun experienced by graphics pipeline components, thereby improving the overall efficiency of the graphics pipeline.

In some implementations, an electronic device estimates the GPU temporal processing value based on an amount of information and/or an amount of information change associated with image frames. For example, in some implementations, the GPU temporal processing value is a function of the complexity of the image frames, and thus may be determined independently of the GPU processing the image frames, such as before the GPU processes the image frames. As another example, in some implementations, the GPU temporal processing value is based on an estimated number of GPU processing cycles associated with the GPU processing the image frames.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first image frame could be termed a second image frame, and, similarly, a second image frame could be termed a first image frame, without departing from the scope of the various described implementations. The first image frame and the second image frame are both image frames, but they are not the same image frame, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

Figure 1:
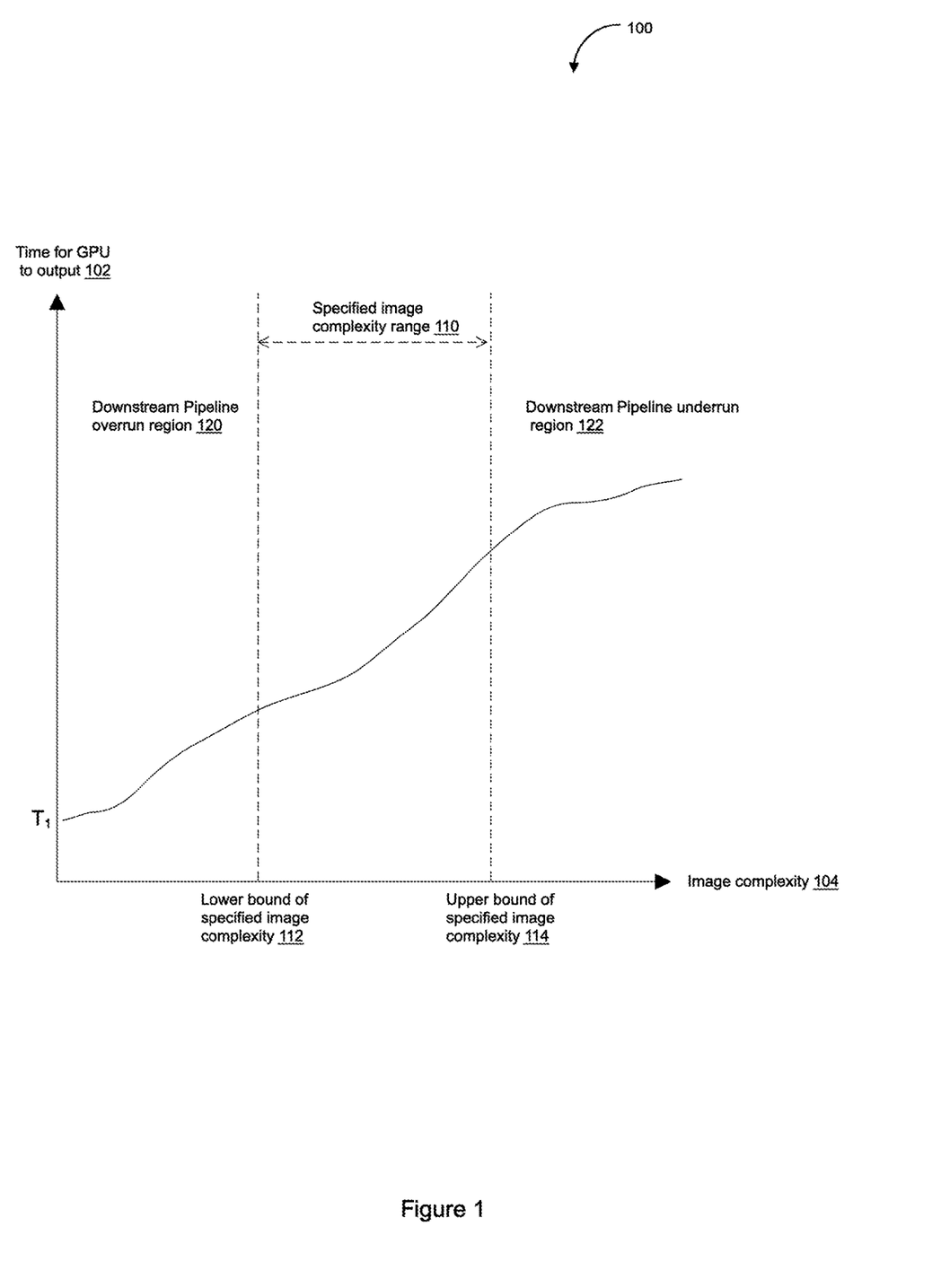
FIG. 1 is a graphical representation of GPU output time as a function of image complexity.

FIG. 1 is a graphical representation 100 of GPU output time as a function of image complexity. As illustrated in FIG. 1, the x-axis of the graphical representation 100 corresponds to image complexity 104, such as the complexity of one image frame or a series of image frames provided by an image sensor. The y-axis of the graphical representation 100 corresponds to GPU output time 102. For example, the GPU output time 102 corresponds to the number of processing cycles a graphics processing unit (GPU) takes to process an image frame multiplied by the GPU clock period T, where T=1/GPU clock frequency (F). As another example, the GPU output time 102 corresponds to the latency between the GPU receiving an image frame and the GPU outputting processed image data associated with the image frame.

As shown in FIG. 1, as the image complexity 104 increases, so does the GPU output time 102. For example, a blank image frame (e.g., all white pixels) is characterized by a relatively low image complexity 104, and accordingly the GPU takes a relatively small amount of time (e.g., $T_1$ in FIG. 1) to process. As a counterexample, an image frame including a variety of different colors, shades, textures, etc. is characterized by a relatively high image complexity 104, and accordingly the GPU takes a relatively large amount of time to process. One of ordinary skill in the art will appreciate that a different GPU may be characterized by a different relationship between GPU output time and image complexity.

As illustrated in FIG. 1, downstream graphics pipeline components, which receive data from the GPU, are configured to operate within a specified image complexity range 110. The specified image complexity range 110 includes a lower bound 112 and an upper bound 114. For example, the downstream graphics pipeline components include an image warper that warps GPU output data as a function of a depth offset between an image sensor and a portion of a physical environment.

When a GPU receives an image frame that is characterized by an image complexity 104 that is less than the lower bound 112, the corresponding GPU output time 102 results in data overrun (e.g., congestion) for the downstream graphics pipeline components, as is indicated by the downstream pipeline overrun region 120 in FIG. 1. For example, the GPU take a relatively low number of cycles to process a blank image frame, and thus the GPU outputs corresponding image data at an output rate that is too high for the downstream graphics pipeline components.

On the other hand, when the GPU receives an image frame that is characterized by an image complexity 104 that is greater than the upper bound 114, the corresponding GPU output time 102 results in data underrun for the downstream graphics pipeline components, as is indicated by the downstream pipeline underrun region 122 in FIG. 1. For example, the GPU take a relatively high number of cycles to process a multi-colored, multi-textured image frame, and thus the GPU outputs corresponding image data at an output rate that is too low for the downstream graphics pipeline components.

Accordingly, when an image sensor outputs, to the GPU, image frames at a constant output rate, the GPU may output corresponding data at a rate that is outside the specified image complexity range 110 of downstream pipeline components, causing data overrun or underrun. By contrast, various implementations disclose herein utilize variations in the image complexity 104 in order to change the image sensor output rate, thereby preventing or reducing instances of the GPU outputting image data outside of the specified image complexity range 110.

Figure 2:
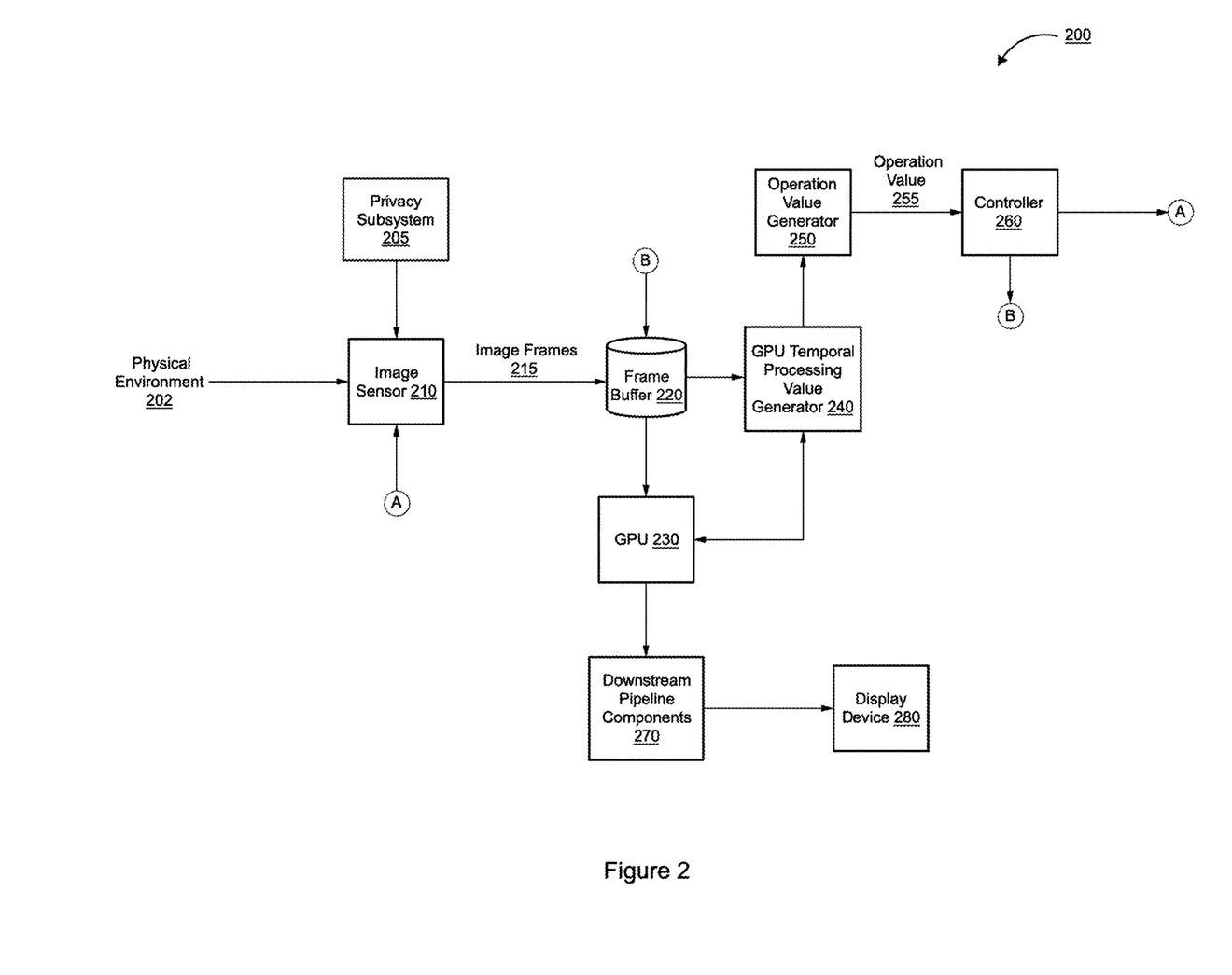
FIG. 2 is an example of a block diagram for controlling an image sensor based on a GPU temporal processing value in accordance with some implementations.

FIG. 2 is an example of a block diagram 200 for controlling an image sensor 210 based on a GPU temporal processing value in accordance with some implementations. While certain specific features are illustrated, those of ordinary skill in the art will appreciate from the present disclosure that various other features have not been illustrated for the sake of brevity and so as not to obscure more pertinent aspects of the example implementations disclosed herein.

In some implementations, the block diagram 200 is integrated within an electronic device. For example, the electronic device corresponds to a head-mountable device (HMD) that includes a display device 280 (e.g., a built-in display). In some implementations, the electronic device includes a head-mountable enclosure. In various implementations, the head-mountable enclosure includes an attachment region to which another device with a display can be attached. In various implementations, the head-mountable enclosure is shaped to form a receptacle for receiving another device that includes a display, such as a mobile phone. For example, in some implementations, an electronic device slides/snaps into or otherwise attaches to the head-mountable enclosure. In some implementations, the display of the device attached to the head-mountable enclosure presents (e.g., displays) a physical environment 202. For example, in some implementations, the electronic device corresponds to a mobile phone that can be attached to the head-mountable enclosure. In various implementations, examples of the electronic device include smartphones, tablets, media players, laptops, etc.

The block diagram 200 includes an image sensor 210 that captures a physical environment 202. In some implementations, an HMD, being worn by a user, includes the image sensor 210, which may correspond to a front-facing camera that captures the physical environment 202 according to current head position and body position of the user.

The image sensor 210 outputs a first plurality of image frames 215 at a first output rate. In some implementations, the block diagram 200 includes a frame buffer 220 that buffers the first plurality of image frames 215, which are provided to a graphics processing unit (GPU) 230. In some implementations, the frame buffer 220 is integrated within the GPU 230. In some implementations, a frame buffer is not utilized, and the image sensor 210 provides the first plurality of image frames 215 directly to the GPU 230.

In various implementations, the block diagram 200 includes a privacy subsystem 205 that includes one or more privacy setting filters associated with user information. In some implementations, the privacy subsystem 205 selectively prevents and/or limits the image sensor 210 from obtaining and/or transmitting the user information within image frames. To that end, the privacy subsystem 205 receives user preferences and/or selections from the user in response to prompting the user for the same. In some implementations, the privacy subsystem 205 prevents the block diagram 200 from obtaining and/or transmitting the user information unless and until the privacy subsystem 205 obtains informed consent from the user. In some implementations, the privacy subsystem 205 anonymizes (e.g., scrambles or obscures) certain types of user information. For example, the privacy subsystem 205 receives user inputs designating which types of user information the privacy subsystem 205 anonymizes. As another example, the privacy subsystem 205 anonymizes certain types of user information likely to include sensitive and/or identifying information, independent of user designation (e.g., automatically).

The GPU 230 processes (e.g., renders, shades, maps, filters, transforms, etc.) the first plurality of image frames 215 and outputs GPU output data for display on a display device 280. The block diagram 200 includes one or more downstream pipeline components 270 that further process the GPU output data. For example, in some implementations, the one or more downstream graphics pipeline components 270 include an image warper that warps the GPU output data as a function of a depth offset between the image sensor 210 and a portion of the physical environment 202, such as a physical table at which the image sensor 210 is facing. As another example, in some implementations, the one or more downstream graphics pipeline components 270 include a camera warper. As yet another example, in some implementations, the one or more downstream graphics pipeline components 270 include a combination of a matting block, hole filling block, blender, a display device compensation block (e.g., lens compensation block), and/or the like.

The block diagram 200 includes a GPU temporal processing value generator 240 that determines a GPU temporal processing value characterizing the GPU processing of the first plurality of image frames 215 by the GPU 230. The GPU temporal processing value is a function of an amount of information associated with the first plurality of image frames 215.

In some implementations, the GPU temporal processing value generator 240 determines the GPU temporal processing value in association with the GPU 230 processing the first plurality of image frames 215. For example, in some implementations, the GPU temporal processing value indicates a GPU output rate associated with the GPU 230 processing the first plurality of image frames 215. As another example, in some implementations, the GPU temporal processing value indicates an amount of time for the GPU 230 to process the first plurality of image frames 215. In some implementations, the GPU temporal processing value generator 240 determines the GPU temporal processing value while or after the GPU 230 processes the first plurality of image frames 215.

In some implementations, the GPU temporal processing value generator 240 estimates the GPU temporal processing value independently of the GPU 230 processing the first plurality of image frames 215. For example, in some implementations, the GPU temporal processing value generator 240 determines the GPU temporal processing value before the GPU 230 finishes processing some or all of the first plurality of image frames 215. In some implementations, the GPU temporal processing value generator 240 obtains the first plurality of image frames 215 from the frame buffer 220. In some implementations, the GPU temporal processing value generator 240 estimates the GPU temporal processing value as a function of an amount of change within the amount of information associated with the first plurality of image frames 215.

Figure 4:
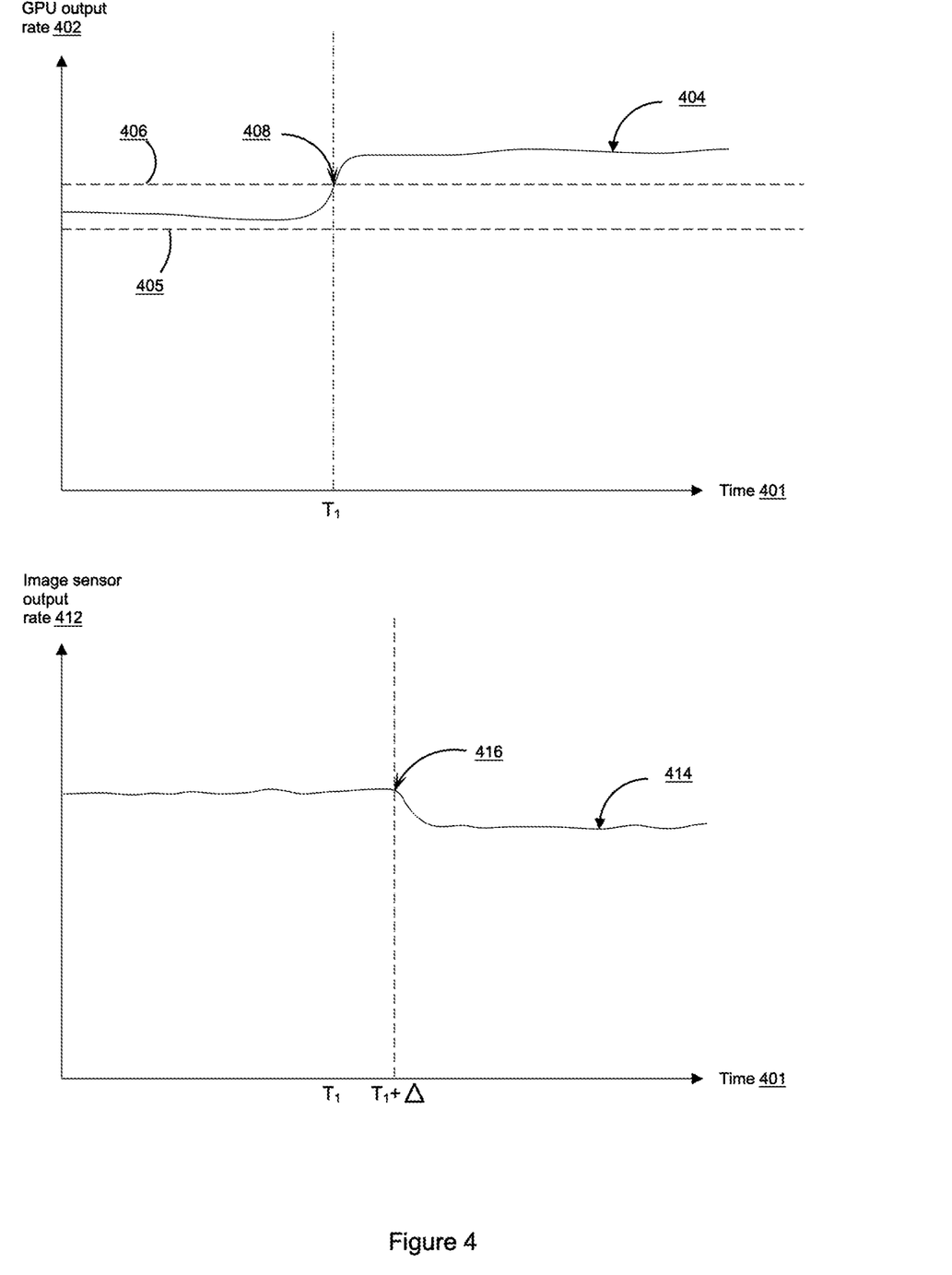
FIG. 4 is an example of setting an image sensor output rate as a function of a GPU output rate in accordance with some implementations.

In some implementations, the GPU temporal processing value generator 240 estimates the GPU temporal processing value without assessing the amount of information in the first plurality of image frames 215. For example, in some implementations, the GPU temporal processing value generator 240 assesses recent processing characteristics of the GPU 230 and estimates the GPU temporal processing value based on the recent processing characteristics. As one example, the GPU temporal processing value generator 240 identifies a recent downtick in the GPU output rate and accordingly updates the GPU temporal processing value. As a counterexample, the GPU temporal processing value generator 240 identifies a recent uptick in the GPU output rate and accordingly updates the GPU temporal processing value, such as illustrated in FIG. 4. In some implementations, the GPU temporal processing value generator 240 estimates the GPU temporal processing value as a function of a current utilization level of a buffer (e.g., the frame buffer 220) being used by the GPU 230.

The block diagram 200 includes an operation value generator 250 that determines an operation value 255 associated with the image sensor 210 based on a function of the GPU temporal processing value. The block diagram includes a controller 260 that modifies the operation of the image sensor 210 as a function of the operation value 255 so that the image sensor 210 provides a second plurality of image frames at a second output rate that is different from the first output rate. For example, in some implementations, the controller 260 sets an output rate of the image sensor 210 to the second output rate within an error threshold. As another example, in some implementations, the controller 260 sets a capture rate for the image sensor 210 that is a function of the second output rate. For example, the capture rate is proportional to the second output rate. As yet another example, in some implementations, the controller 260 instructs the frame buffer 220 to discard (e.g., not store) a portion of the second plurality of image frames in order to reduce the second output rate, as compared with the first output rate.

Figure 3:
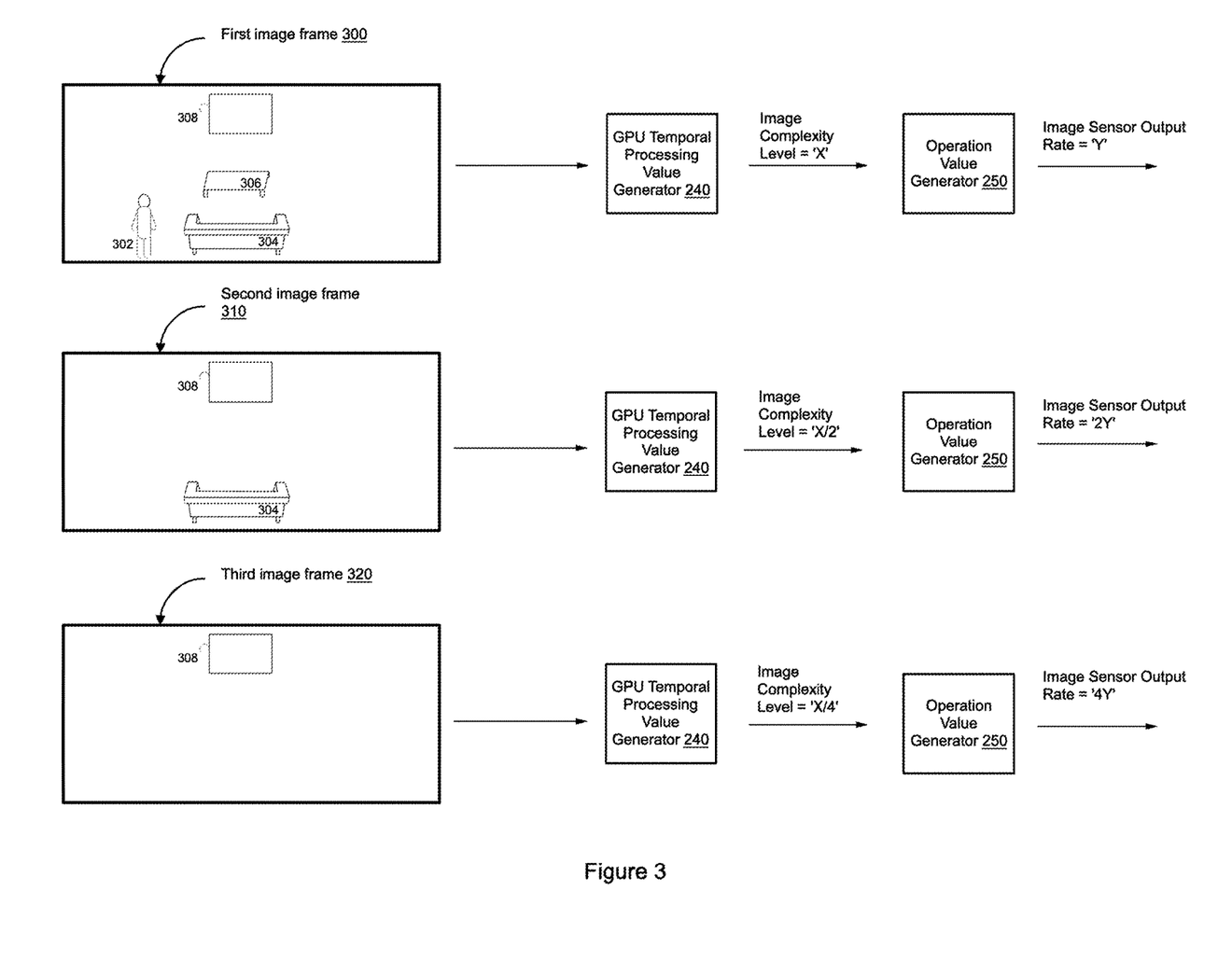
FIG. 3 is an example of setting an image sensor output rate as a function of varying image complexity levels in accordance with some implementations.

FIG. 3 is an example of setting an image sensor output rate as a function of varying image complexity levels in accordance with some implementations. In some implementations, setting the image sensor output rate is performed by the block diagram 200 or portions thereof.

As illustrated in FIG. 3, a first image frame 300 includes representations of four physical objects corresponding to an individual 302, a couch 304, a table 306, and a television 308. For example, the image sensor 210 provides the first image frame 300 as part of the first plurality of image frames 215. In some implementations, a GPU temporal processing value generator 240 identifies the four physical objects and accordingly determines a GPU temporal processing value that characterizes the first image frame 300 as having an image complexity level of 'X.' Based on the image complexity level of 'X,' an operation value generator 250 determines an image sensor output rate of 'Y.' In some implementations, as described with reference to FIG. 3, the image sensor output rate is linearly related to the image complexity level. In some implementations, the image sensor output rate is a non-linear function of the image complexity level.

Moreover, a second image frame 310 includes representations of two physical objects corresponding to the couch 304 and the television 308. The second image frame 310 is less complex than the first image frame 300 because the second image frame 310 includes representations of fewer physical objects. Accordingly, in some implementations, the GPU temporal processing value generator 240 identifies the two physical objects and determines a GPU temporal processing value that characterizes the second image frame 310 as having an image complexity level of 'X/2.' One of ordinary skill in the art will appreciate that, in some implementations, the GPU temporal processing value generator 240 determines the GPU temporal processing value based on a different metric than the number of physical objects represented by an image frame, such as the number of non-white pixels, the number of different colors, the level of texture, and/or the like. Based on the image complexity level of 'X/2,' the operation value generator 250 determines an image sensor output rate of '2Y.' Thus, in some implementations, the image sensor 210 outputs the second image frame 310 at an output rate that is twice an output rate at which the image sensor 210 outputs the first image frame 300.

Moreover, a third image frame 320 includes a representation of a single physical object corresponding to the television 308. The third image frame 320 is less complex than the first image frame 300 and the second image frame 310 because the third image frame 320 includes representations of fewer physical objects. Accordingly, in some implementations, the GPU temporal processing value generator 240 identifies the single physical object and determines a GPU temporal processing value that characterizes the third image frame 320 as having an image complexity level of 'X/4.' In other words, the third image frame 320 has an image complexity level of 'X/4' because there are four times fewer objects therein than in the first image frame 300, which has an image complexity level of 'X.' Based on the image complexity level of 'X/4,' the operation value generator 250 determines an image sensor output rate of '4Y.' Thus, in some implementations, the image sensor 210 outputs the third image frame 320 at an output rate that four times larger than an output rate at which the image sensor 210 outputs the first image frame 300.

FIG. 4 is an example of setting an image sensor output rate as a function of a GPU output rate in accordance with some implementations. In some implementations, setting the image sensor output rate is performed by the block diagram 200 or portions thereof.

The top graph represents a GPU output rate function 404. The CPU output rate function 404 represents the output rate that a GPU outputs data based on image frames received from an image sensor. The x-axis corresponds to time 401 and the y-axis corresponds to GPU output rate 402. For example, the GPU output rate 402 corresponds to the amount of data output by the GPU over a specific period of time. The top graph includes an upper threshold GPU output rate 406 and a lower threshold GPU output rate 405.

As the time 401 approaches time $T_1$, the GPU output rate function 404 begins to slope upwards, indicating an increase (e.g., an uptick) in the GPU output rate 402. In some implementations, the increase in the GPU output rate 402 results from an increase in the complexity of image frames provided from the image sensor. For example, an HMD that includes an image sensor changes position from facing a white wall (low complexity image data) to facing the surface of a multi-colored table (high complexity image data), resulting in an increase in the GPU output rate 402. At time $T_1$, the GPU output rate function 404 has a value indicated by 408, which crosses (e.g., breaches) the upper threshold GPU output rate 406. Consequently, in some implementations, an electronic device (e.g., including portions of the block diagram 200) determines that an operation change to the image sensor is appropriate.

Namely, as illustrated in the bottom graph, at time $T_1+\Delta$, the electronic device begins reducing the value of an image sensor output rate function 414, as indicated by a marker 416. The image sensor output rate function 414 represents the output rate that the image sensor outputs image frames to the GPU for processing. The x-axis corresponds to time 401 and the y-axis corresponds to the image sensor output rate 412. Accordingly, reducing the image sensor output rate results in the GPU receiving image frames less frequently, thereby providing the GPU more time to process each image frame.

Figure 5:
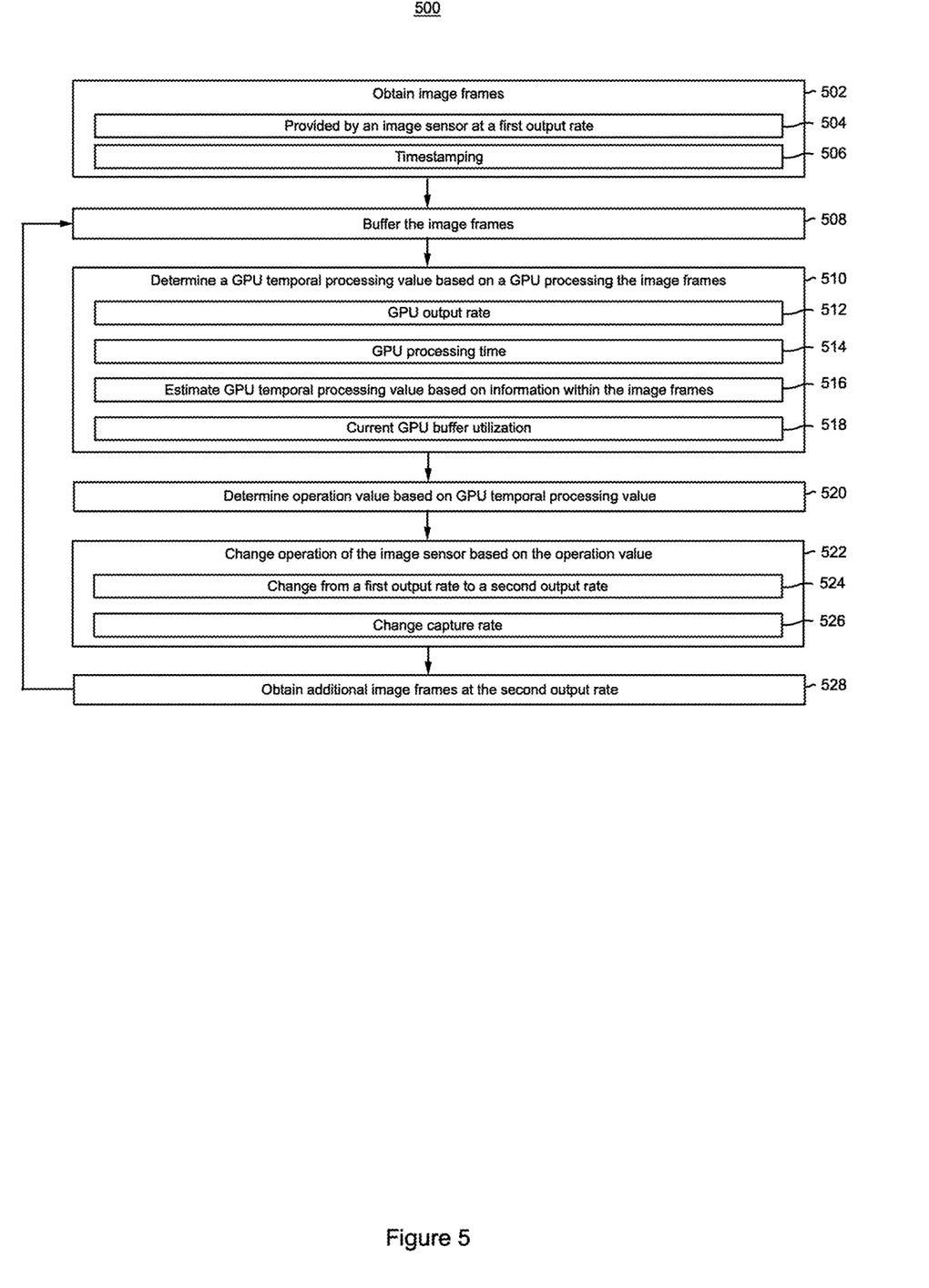
FIG. 5 is an example of a flow diagram of a method of controlling an image sensor based on a GPU temporal processing value in accordance with some implementations.

FIG. 5 is an example of a flow diagram of a method 500 of controlling an image sensor based on a GPU temporal processing value in accordance with some implementations. In various implementations, the method 500 or portions thereof are performed by the block diagram 200 or portions thereof. In various implementations, the method 500 or portions thereof are performed by a head-mountable device (HMD) including a controller (e.g., a CPU), a non-transitory memory, and a GPU. In some implementations, the method 500 is performed by processing logic, including hardware, firmware, software, or a combination thereof. In some implementations, the method 500 is performed by a processor executing code stored in a non-transitory computer-readable medium (e.g., a memory). In some implementations, the method 500 is performed at an electronic device including a controller (e.g., a CPU) and a GPU, wherein the controller is the master system and the GPU is the slave system.

As represented by block 502, the method 500 includes obtaining a first plurality of image frames. In some implementations, the first plurality of image frames is a sequence of image frames, such as a video stream.

As represented by block 504, the first plurality of image frames is provided by an image sensor at a first output rate. In some implementations, the first output rate is a function of a capture rate of the image sensor. For example, the first output rate is proportional to the capture rate. In some implementations, the image sensor is integrated in the electronic device, such as within an HMD. In some implementations, the image sensor is physically separate from the electronic device, such as a camera within a drone that is separate from but communicatively coupled to a base unit electronic device.

As represented by block 506, in some implementations, each of a portion of the first plurality of image frames is associated with a timestamp. For example, a timestamp indicates when the image sensor captures an image within an error threshold. As another example, a timestamp indicates when a corresponding image frame is output by the image sensor within an error threshold.

As represented by block 508, in some implementations, the method 500 includes storing, in a buffer, the first plurality of image frames provided by the image sensor. For example, with reference to FIG. 2, the block diagram 200 (e.g., the controller 260) stores the first plurality of image frames 215 in the frame buffer 220.

As represented by block 510, the method 500 includes determining a GPU temporal processing value characterizing the GPU processing of the first plurality of image frames. The GPU temporal processing value is a function of an amount of information associated with the first plurality of image frames. For example, the GPU temporal processing value indicates a recent uptick or downtick in the GPU output rate. As another example, the GPU temporal processing value is based on the processing resources utilized by the GPU in processing the first plurality of image frames. As another example, the GPU temporal processing value is based on a combination of core clock speed of the GPU, memory clock speed of the GPU, number of parallel processing threads utilized by the GPU, power consumption of the GPU, etc. In some implementations, determining the GPU temporal processing value is a function of the plurality of timestamps, as described with reference to block 506.

In some implementations, the method 500 includes determining the GPU temporal processing value based on a subset of pixels of the first plurality of image frames. For example, the method 500 includes determining an image complexity of the first plurality of image frames by assessing pixel values (or changes thereof) of a particular area within each of the first plurality image frames. In some implementations, a system includes multiple image sensors, and the image sensors operate in a simultaneous mode (e.g., exposure during readout of the image). Accordingly, for an image frame, the system may evaluate a portion (e.g., a slice) of the image frame in order to enable changing operation of one or more of the image sensors for a subsequent image frame before exposure of the subsequent image frame.

As represented by block 512, in some implementations, the GPU temporal processing value indicates a GPU output rate associated with the GPU processing the first plurality of image frames. As represented by block 514, in some implementations, the GPU temporal processing value indicates an amount of time for the GPU to process the first plurality of image frames. For example, the amount of time corresponds to the number of GPU processing cycles multiplied by the GPU clock period (T). As another example, the amount of time corresponds to a delay time between when an image frame arrives at the GPU input to when the GPU outputs corresponding data.

As represented by block 516, in some implementations, determining the GPU temporal processing value includes estimating the GPU temporal processing value based on the amount of information associated with the first plurality of image. In some implementations, the GPU temporal processing value is a function of the image complexity of the first plurality of image frames. For example, with reference to FIG. 3, the GPU temporal processing value generator 240 estimates image complexity levels (e.g., 'X', 'X/2','X/4') based on the number of physical objects within the respective image frame. As another example, a higher image resolution or a larger number of different colors/textures/etc.

within the first plurality of image frames results in a higher estimated GPU temporal processing value.

In some implementations, estimating the GPU temporal processing value is independent of the GPU processing the first plurality of image frames. For example, in some implementations, the method 500 includes estimating the GPU temporal processing value before the GPU receives the first plurality of images. In some implementations, estimating the GPU temporal processing value is a function of an amount of change within the amount of information associated with the first plurality of image frames. For example, more informational change across the first plurality of image frames results in a higher estimated GPU temporal processing value (e.g., higher number of processing cycles), and vice versa.

As represented by block 518, in some implementations, determining the GPU temporal processing value is a function of a current utilization level of a buffer being used by the GPU, such as a non-transitory memory or a cache. For example, if a GPU buffer is 95% full and the first plurality of images includes complex information, then the method 500 includes reducing the rate of the image sensor output. In some implementations, the buffer being used by the GPU is separate from the GPU, such as illustrated in FIG. 2. In some implementations, the buffer being used by the GPU is a component of the GPU.

As represented by block 520, the method 500 includes determining an operation value associated with the image sensor based on a function of the GPU temporal processing value. The operation value modifies the operation of the image sensor. For example, with reference to FIG. 3, the operation value generator 250 determines operation values for respective image frames based on corresponding image complexity levels. As another example, the method 500 includes comparing a GPU output rate, as indicated by the GPU temporal processing value, against a nominal GPU output rate. When the GPU output rate exceeds the nominal GPU output rate, the method 500 includes decreasing the image sensor output rate, and vice versa for when the GPU output rate falls below the nominal GPU output rate.

As represented by block 522, the method 500 includes changing, using the controller, the operation of the image sensor as a function of the operation value so that the image sensor provides a second plurality of image frames at a second output rate. For example, changing the operation of the image sensor includes changing a combination of image sensor output rate, image sensor delay value, image sensor output decimation value, etc. In some implementations, the method 500 includes retrieving, via the controller, a portion of the first plurality of image frames from a buffer as a function of the GPU temporal processing value, and providing the portion of the first plurality of image frames to the GPU. In this way, the method 500 includes discarding certain image frames in order to effectively reduce the image sensor output rate.

As represented by block 524, in some implementations, changing the operation of the image sensor as the function of the operation value includes setting an image sensor output rate to the second output rate within an error threshold. As represented by block 526, in some implementations, changing the operation of the image sensor as the function of the operation value includes setting a capture rate for the image sensor that is a function of the second output rate. To that end, in some implementations, the method 500 includes changing the capture rate in order to track changes from the first output rate to the second output rate.

In some implementations, changing the operation of the image sensor as the function of the operation value includes changing other settings of the image sensor in real-time. For example, the method 500 includes increasing or decreasing the horizontal/vertical blank of the image frame in order to more finely control the frame rate. As another example, the method 500 includes a combination of slowing down or speeding up a pixel clock, performing horizontal and vertical binning (e.g., by utilizing a fractional ratio), adding metadata to an image frame that describes an applied settings, applying compression, determining temporal pixel differences (e.g., from a previous image frame), applying length encoding or quad-tree to reduce transferred data, changing the ROI (region of interest), and/or the like.

As represented by block 528, in some implementations, the method 500 includes, after changing the operation of the image sensor, obtaining, using the controller, the second plurality of image frames at the second output rate provided by the image sensor. The method 500 includes providing, via the controller, the second plurality of image frames to the GPU, and processing, at the GPU, the second plurality of images frames. In some implementations, the controller orchestrates the data transfer, such as by using a cache. In some implementations, as illustrated in FIG. 5, the method 500 proceeds back to a portion of the method 500 represented by block 508.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device including a controller, a non-transitory memory, and a graphics processing unit (GPU):
obtaining a first plurality of image frames that are provided by an image sensor at a first output rate;
determining a GPU temporal processing value characterizing the GPU processing of the first plurality of image frames, wherein the GPU temporal processing value is a function of an amount of information associated with the first plurality of image frames;
determining an operation value associated with the image sensor based on a function of the GPU temporal processing value, wherein the operation value modifies the operation of the image sensor; and
changing, using the controller, the operation of the image sensor as a function of the operation value so that the image sensor provides a second plurality of image frames at a second output rate.

2. The method of claim 1, wherein the GPU temporal processing value indicates a GPU output rate associated with the GPU processing the first plurality of image frames.

3. The method of claim 1, wherein the GPU temporal processing value indicates an amount of time for the GPU to process the first plurality of image frames.

4. The method of claim 1, further comprising:
after changing the operation of the image sensor, obtaining, using the controller, the second plurality of image frames at the second output rate provided by the image sensor;
providing, via the controller, the second plurality of image frames to the GPU; and
processing, at the GPU, the second plurality of image frames.

5. The method of claim 1, wherein determining the GPU temporal processing value includes estimating the GPU temporal processing value based on the amount of information associated with the first plurality of images.

6. The method of claim 5, wherein estimating the GPU temporal processing value is independent of the GPU processing the first plurality of image frames.

7. The method of claim 5, wherein estimating the GPU temporal processing value is a function of an amount of change within the amount of information associated with the first plurality of image frames.

8. The method of claim 1, wherein determining the GPU temporal processing value is a function of a current utilization level of a buffer being used by the GPU.

9. The method of claim 1, wherein each of the first plurality of image frames is associated with a timestamp, and wherein determining the GPU temporal processing value is based on a function of a plurality of timestamps.

10. The method of claim 1, wherein changing the operation of the image sensor as the function of the operation value includes setting an image sensor output rate to the second output rate within an error threshold.

11. The method of claim 1, wherein changing the operation of the image sensor as the function of the operation value includes setting a capture rate for the image sensor that is a function of the second output rate.

12. The method of claim 1, further comprising:
storing, in a buffer, the first plurality of image frames provided by the image sensor;
retrieving, via the controller, a portion of the first plurality of image frames from the buffer as a function of the GPU temporal processing value; and
providing the portion of the first plurality of image frames to the GPU.

13. The method of claim 1, wherein the electronic device corresponds to a head-mountable device (HMD) that includes the image sensor and a display device for displaying display data output from the GPU.

14. An electronic device comprising:
a controller;
a non-transitory memory;
a graphics processing unit (GPU); and
one or more programs, wherein the one or more programs are stored in the non-transitory memory and configured to be executed by the controller, the one or more programs including instructions which, when executed, cause the controller to perform operations including:
obtaining a first plurality of image frames that are provided by an image sensor at a first output rate;
determining a GPU temporal processing value characterizing the GPU processing of the first plurality of image frames, wherein the GPU temporal processing value is a function of an amount of information associated with the first plurality of image frames;
determining an operation value associated with the image sensor based on a function of the GPU temporal processing value, wherein the operation value modifies the operation of the image sensor; and
changing the operation of the image sensor as a function of the operation value so that the image sensor provides a second plurality of image frames at a second output rate.

15. The electronic device of claim 14, wherein the GPU temporal processing value indicates a GPU output rate associated with the GPU processing the first plurality of image frames.

16. The electronic device of claim 14, wherein the GPU temporal processing value indicates an amount of time for the GPU to process the first plurality of image frames.

17. The electronic device of claim 14, wherein the electronic device corresponds to a head-mountable device (HMD) that includes the image sensor and a display device for displaying display data output from the GPU.

18. A non-transitory computer-readable medium including instructions, which, when executed by an electronic device including a controller and a graphics processing unit (GPU), cause the electronic device to:

obtain a first plurality of image frames that are provided by an image sensor at a first output rate;

determine a GPU temporal processing value characterizing the GPU processing of the first plurality of image frames, wherein the GPU temporal processing value is a function of an amount of information associated with the first plurality of image frames;

determine an operation value associated with the image sensor based on a function of the GPU temporal processing value, wherein the operation value modifies the operation of the image sensor; and change, using the controller, the operation of the image sensor as a function of the operation value so that the image sensor provides a second plurality of image frames at a second output rate.

19. The non-transitory computer-readable medium of claim 18, wherein the GPU temporal processing value indicates a GPU output rate associated with the GPU processing the first plurality of image frames.

20. The non-transitory computer-readable medium of claim 18, wherein the GPU temporal processing value indicates an amount of time for the GPU to process the first plurality of image frames.

21. The non-transitory computer-readable medium of claim 18, wherein the instructions further cause the electronic device to:

after changing the operation of the image sensor, obtain, using the controller, the second plurality of image frames at the second output rate provided by the image sensor;

provide, via the controller, the second plurality of image frames to the GPU; and process, at the GPU, the second plurality of image frames.

* * * * *